United States Patent [19]

Forrester et al.

[11] 4,350,971
[45] Sep. 21, 1982

[54] CIRCUIT FOR USE IN THE DETECTION OF THE CONDITION OF AN ISOLATED SWITCH CONTACT

[75] Inventors: John S. Forrester; David F. Swindell, both of West Midlands; Michael A. Wildsmith, Birmingham, all of England

[73] Assignee: Lucas Industries Limited, Birmingham, England

[21] Appl. No.: 181,353

[22] Filed: Aug. 26, 1980

[30] Foreign Application Priority Data

Sep. 13, 1979 [GB] United Kingdom ............... 7931818

[51] Int. Cl.³ .................... B60C 23/02; G08B 21/00
[52] U.S. Cl. .................... 340/52 R; 73/146.5; 200/61.22; 324/239; 331/47; 331/64; 331/112; 331/117 FE; 340/646
[58] Field of Search ............. 340/58, 646, 671, 676; 200/61.22, 61.25; 73/146.5; 324/239; 331/47, 64, 65, 109, 112, 117 FE, 151, 117 R

[56] References Cited

U.S. PATENT DOCUMENTS

| | | | |
|---|---|---|---|
| 2,894,246 | 7/1959 | DeGraffenried | 340/58 X |
| 3,092,806 | 6/1963 | Field | 340/58 |
| 3,374,460 | 3/1968 | Massoubre | 340/58 |
| 3,602,884 | 8/1971 | Brumbelow | 340/58 |
| 3,614,732 | 10/1971 | Lejeune | 340/58 |
| 3,656,137 | 4/1972 | Ratz | 340/676 |
| 3,665,387 | 5/1972 | Enabnit | 340/58 |
| 3,806,828 | 4/1974 | Johnson | 331/117 R X |
| 3,831,161 | 8/1974 | Enabnit | 340/676 X |
| 4,072,926 | 2/1978 | Shimahara et al. | 340/58 |
| 4,087,800 | 5/1978 | Lee | 340/676 |

Primary Examiner—Thomas A. Robinson
Assistant Examiner—Joseph E. Nowicki
Attorney, Agent, or Firm—Holman & Stern

[57] ABSTRACT

A tire pressure monitoring system includes a tuned circuit with a pressure sensitive switch which is closed when the tire pressure is normal, connected across it, the tuned circuit and switch being mounted on the vehicle wheel. Mounted on a part of the vehicle is a detector circuit including an oscillator which includes an inductor which is at least intermittently coupled to the inductor of the tuned circuit. When the switch is closed the oscillator runs normally and its output is detected to indicate that all is well. When switch is open, however, the oscillator output is suppressed whenever the inductors are coupled together. The circuit can also be used in other applications where it is required to detect the state of an isolated switch.

18 Claims, 3 Drawing Figures

CIRCUIT FOR USE IN THE DETECTION OF THE CONDITION OF AN ISOLATED SWITCH CONTACT

This invention relates to a circuit for use in the detection of the condition of an isolated switch contact and has particular, but not exclusive, application to the monitoring of vehicle pneumatic tire pressures wherein the switch contact is a tire pressure sensitive device and is mounted on a vehicle wheel.

In vehicle tire pressure monitoring applications many suggestions have been made for detecting the switch contact condition including arrangements in which there are magnetically operable switches and inductors connected in circuit with the contacts and these co-operate with permanent magnets and pick-up windings on the vehicle. Other arrangements have been suggested in which a transmitter is provided on the vehicle which coacts with a pick-up circuit in series with the switch contact, which responds to the transmitter output dependent on whether the switch contact is open or closed.

None of the previously proposed circuits has been totally satisfactory in the sense that various malfunctions can occur which prevent the detector being able to distinguish between the contact open and contact closed conditions.

According to one aspect of the present invention there is provided a circuit for detecting the condition of an isolated switch contact comprising the combination of a tuned circuit including an inductor, said switch contact being connected in parallel with said tuned circuit, an oscillator circuit including a further inductor arranged to be at least intermittently magnetically coupled to the inductor of the tuned circuit, such that when the switch contact is closed the oscillator circuit continuously produces an oscillatory output, whereas when said switch is open and the inductors are magnetically coupled, the tuned circuit absorbs oscillations of the oscillator circuit and prevents the oscillator circuit from producing said oscillator output.

Preferably, the oscillator includes an amplifier having a resistive negative feedback path, and a positive feedback path shunted to "earth" by a further tuned circuit including said further inductor and a capacitor in parallel and tuned to the same resonant frequency as said first mentioned tuned circuit.

The amplifier is preferably an operational amplifier having a resistor connected between its output terminal and its inverting input terminal to define said negative feedback path, and also having a resistor connecting the output terminal to its non-inverting input terminal and said further tuned circuit connected between the non-inverting input terminal and "earth".

The invention also resides in a vehicle tire pressure monitoring system comprising a tuned circuit including an inductor, tire pressure sensitive switch means connected in parallel with said tuned circuit and arranged to be closed when the associated tire pressure is in excess of a predetermined level, said tuned circuit and said switch being mounted on a vehicle wheel assembly, an oscillator circuit also including an inductor mounted on a part of the vehicle such that the inductor of the oscillator circuit is magnetically coupled to the inductor of the tuned circuit at least periodically when the wheel is rotating, the arrangement being such that when the switch means is closed the oscillator circuit continuously produces an oscillatory output, whereas when said switch is open and the inductors are magnetically coupled, the tuned circuit absorbs oscillations of the oscillator circuit and prevents the oscillator circuit from producing said oscillatory signal.

In the accompanying drawings.

Figure 1:
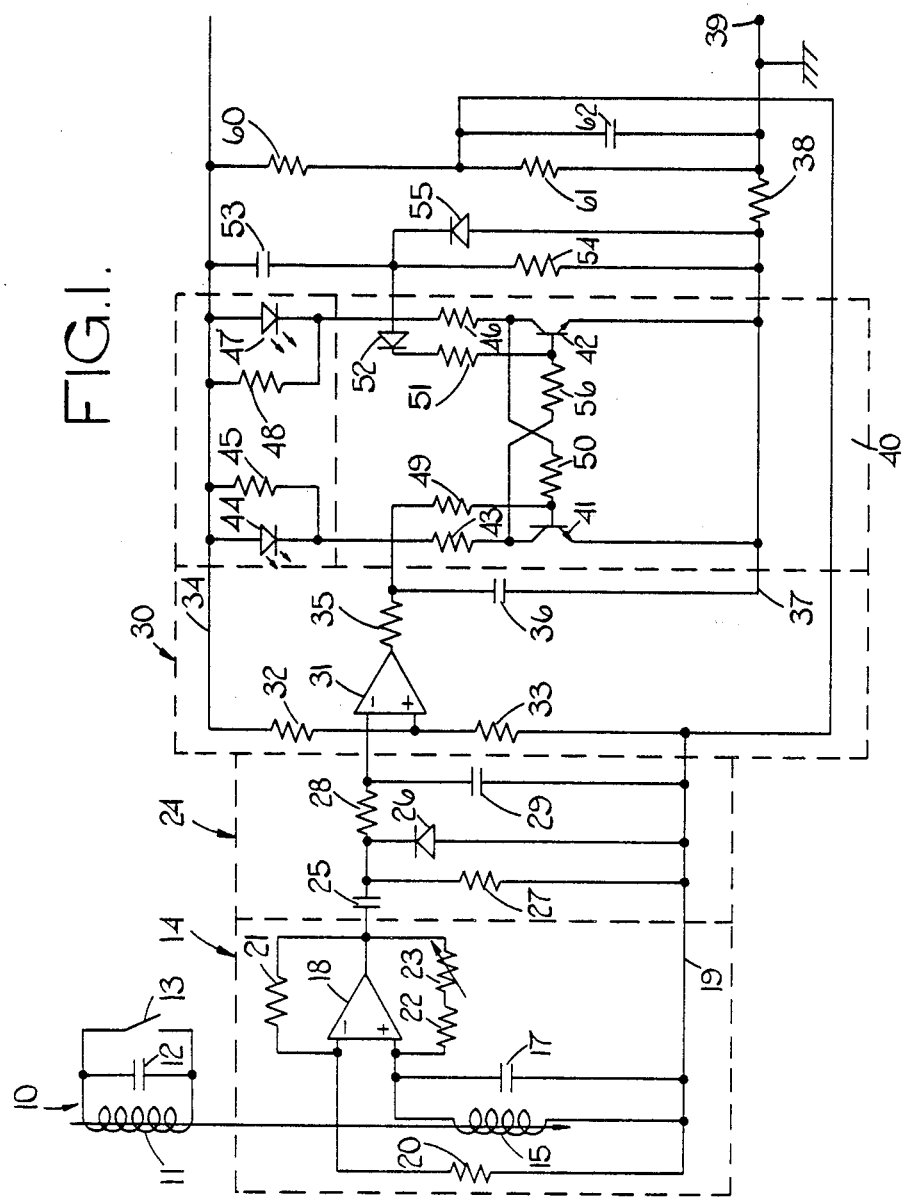
FIG. 1 is a circuit diagram of one example of the invention.

Referring firstly to FIG. 1, the system shown includes a passive tuned circuit 10 consisting of an inductor 11 and a capacitor 12, with a tire pressure sensitive switch 13 connected in parallel with the inductor 11 and the capacitor 12. The tuned circuit 10 and the switch 13 are mounted on a rotating part of the wheel assembly of a vehicle with the pressure switch 13 sensing the pressure in the tire on that wheel.

The system also includes an oscillator circuit 14 which is mounted on a fixed part of the vehicle so that it can be connected by wires to the vehicle battery and to a display on the vehicle dashboard (or elsewhere). The oscillator circuit is an LC sine-wave oscillator and includes an inductor 15 and capacitor 17 of the same values as those used in the passive tuned circuit 10. The inductor 16 is situated so that as the wheel rotates the inductor 11 passes close to it and the two inductors are thus magnetically coupled periodically. The inductor 15 and the capacitor 17 are connected in parallel with one another between the non-inverting input of an operational amplifier 18 and a reference voltage rail 19. The inverting input of amplifier 18 is connected by a resistor 20 to the rail 19 and by a resistor 21 to the output terminal of amplifier 18. The non-inverting input of the amplifier 18 is connected to its output terminal by a resistor 22 and a variable resistor 23 in series.

In the absence of the tuned circuit 10 the circuit surrounding amplifier 18 acts as an oscillator, the variable resistor 23 being adjusted so that the a.c. positive feedback at the resonant frequency of the tuned circuit 15, 17 exceeds the negative feedback via the resistor 21. When the tuned circuit 10 is brought into proximity to the inductor 15, however, and the switch 13 is open, the coupling between the inductors 11, 15 effectively decreases the impedance of the tuned circuit 15, 17 so that the a.c. positive feedback is reduced and oscillation ceases. When switch 13 is closed the oscillator is not affected by proximity of the tuned circuit 10, but oscillations continue.

A detector circuit 24 is connected to the output of the oscillator 14 and includes a capacitor 25 connecting the output of amplifier 18 to the cathode of a diode 26, the anode of which is connected to rail 19. A resistor 27 is connected across diode 26. A further resistor 28 and a capacitor 29 are connected in series across the diode 26. It will be appreciated that whenever the oscillator 14 is producing an oscillating signal, a positive voltage will collect on the capacitor 29, but this capacitor will discharge via resistors 27 and 28 when there is no oscillating signal being produced.

A comparator stage 30 is connected to detect the voltage on capacitor 29. This stage 30 includes an operational amplifier 31 with its inverting input connected to the junction of resistor 28 and capacitor 29. The non-inverting input of the amplifier 31 is connected to the junction of two resistors 32, 33 which are in series between a +ve supply rail 34 and the rail 19. The output of amplifier 31 goes high whenever there is an interruption in the oscillating signal from amplifier 18. The output of amplifier 31 is connected by a resistor 35 and a capacitor 36 in series to a rail 37 which is connected by a resistor 38 to an earth terminal 39.

A flip-flop memory circuit 40 is connected to the output of the comparator 30. This memory circuit 40 comprises two npn transistors 41, 42 having their emitters connected to the rail 37. The collector of transistor 41 is connected by a resistor 43 and a light-emitting diode 44 in series to the rail 34, a resistor 45 being connected across the l.e.d. 44. Similarly resistors 46 and 48 and an l.e.d. 47 connect the collector of transistor 42 to the rail 34. The base of transistor 41 is connected by a resistor 49 to the junction of the resistor 35 and the capacitor 36 and is also connected by a resistor 50 by the collector of the transistor 42. The base of the transistor 41 is connected by a resistor 51 and a diode 52 in series to an initialising circuit including a capacitor 53 and a resistor 54 in series between the rails 34, 37 with a diode 55 connected across resistor 54, the anode of diode 52 being connected to the cathode of diode 55, the anode of which is connected to rail 37. A further resistor 56 connects the base of the transistor 42 to the collector of the transistor 41.

When the circuit is first switched on current initially flows through the capacitor 53 which biases transistor 42 on, so that it is this transistor which turns on hard as the circuit becomes active. L.e.d. 47 is therefore illuminated initially (provided that oscillator 14 starts to oscillate). The memory circuit remains in this condition until the output of amplifier 31 goes high for a sufficient period to allow capacitor 36 to charge to a voltage high enough for the current in resistor 49 to start turning on the transistor 41. In this event transistor 41 turns on hard, transistor 42 turns off and only l.e.d. 44 is lit indicating a fault condition.

The resistor 35 and capacitor 36 prevent triggering of the memory circuit 40 by transients.

The voltage on rail 19 is derived from the junction of two resistors 60, 61 connected in series between rail 34 and terminal 39, with a smoothing capacitor 62 connected across the resistor 61.

Figure 2:
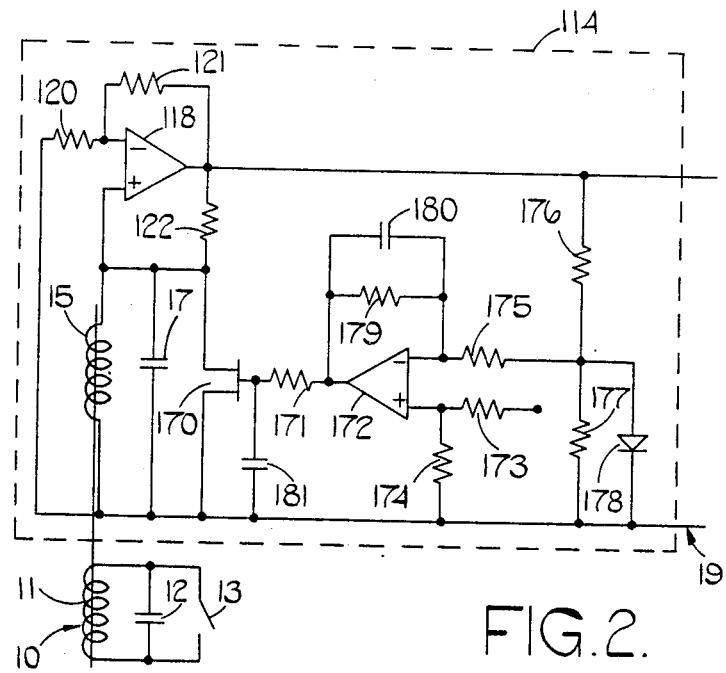
FIGS. 2 and 3 are circuit diagrams of two alternative forms of oscillator which can be used in the circuit of FIG. 1.

Turning now to the modification shown in FIG. 2 a more complex form of oscillator 114 is shown which can be used in place of the oscillator 14 of FIG. 1. This oscillator 114 includes an operational amplifier 118 with its inverting input connected to rail 119 by a resistor 120 and to its output terminal by a resistor 121. The inductor 15 and capacitor 17 are connected, as before, in parallel between the non-inverting input of amplifier 118 and rail 119. A field effect transistor 170 is however connected with its drain-source path in parallel with the inductor 15 and capacitor 17 so as to provide a variable resistor connected across the tuned circuit 15, 17. A resistor 122 connects the tuned circuit 15, 17 to the amplifier output. The gate of the f.e.t. 170 is connected by a resistor 171 to the output terminal of an operational amplifier 172 the non-inverting input of which is connected to the junction of two resistors 173, 174 between the rail 19 and a reference voltage source (not shown) about ½ v below the voltage on rail 19. The inverting input of amplifier 172 is connected by a resistor 175 to the junction of two resistors 176, 177 which are in series between the output of amplifier 118 and the rail 19. A diode 178 has its anode connected to the junction of resistors 176, 177 and its cathode connected to the rail 19. Feedback around the amplifier 172 is provided by a resistor 179 and a capacitor 180 in parallel between the output of amplifier 172 and its inverting input. A capacitor 181 connects the gate of the f.e.t. 170 to the rail 19.

The values of the resistors 173, 174, 175 and 176 are chosen so that in a steady state with no oscillatory output from the amplifier the voltage at the output of the amplifier 172 is low enough to turn off the f.e.t. 170 completely so that the full output of the amplifier 118 is fed back via the resistor 122, i.e. in this condition the positive feedback round the amplifier 118 is at a maximum. When an oscillatory output is being produced the output of amplifier 172 will become less negative as the amplitude of the oscillating signal increases, thereby turning on f.e.t. which acts in the arrangement shown as a variable resistance. Thus the proportion of the amplifier 118 output fed back by the resistor 122 decreases as the amplitude increases and, in fact, the circuit stabilises with the f.e.t. 170 set to an impedance such that stable oscillation is just occurring. When the tuned circuit 10 is juxtaposed to the inductor 15, with switch 13 open the oscillations stop, the time constant of resistor 171 with capacitor 181 being long (about 10 seconds) so that oscillation is not re-established.

Figure 3:
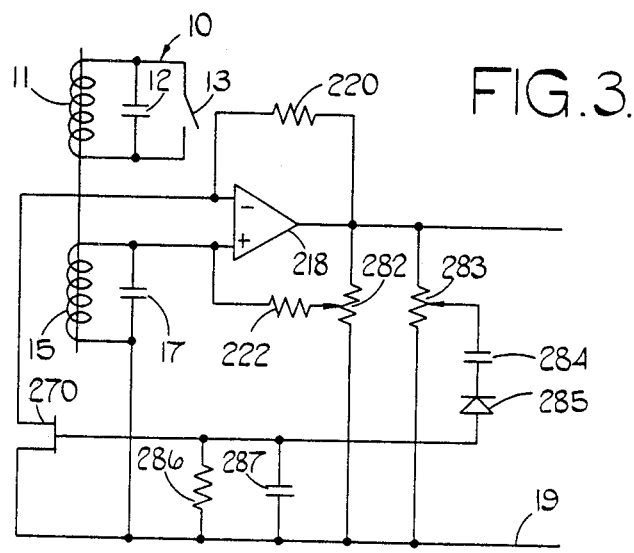

In the alternative oscillator shown in FIG. 3 a circuit is shown in which an f.e.t. 270 is used to vary the gain of the operational amplifier 218 corresponding to amplifier 118 in FIG. 2. The drain-source of the f.e.t. 270 is connected between the inverting input of amplifier 218 and the rail 19. A resistor 220 connects this inverting input to the output of amplifier 218. A resistor 222 connects the non-inverting input of amplifier 218 to the slider of a potentiometer 282 connected between the output terminal of amplifier 218 and the rail 19. A second potentiometer 283 is connected between the same points, and its slider is connected by a capacitor 284 to the cathode of a diode 285 the anode of which is connected to the gate of the f.e.t 270. A resistor 286 and a capacitor 287 in parallel connect the gate of the f.e.t. to the rail 19. As in the example described in FIG. 2, the f.e.t. impedance is automatically adjusted so that oscillation is just maintained in normal circumstances, the gain of amplifier 218 increases as the resistance of the f.e.t. decreases, which occurs when the amplitude of oscillation falls.

The circuits shown in FIGS. 2 and 3 does not need any adjustment when fitted to a vehicle to ensure that oscillation occurs when required.

In the above embodiments the inductors 11 and 15 are relatively small inductors mounted at positions spaced from the wheel axis so that they are magnetically coupled only briefly during each wheel rotation. In this case when the tire pressure is low the oscillations are interrupted on each rotation of the wheel. In alternative embodiments (not shown), however, larger coils may be used which are arranged concentrically with the wheel. Thus the coils are always coupled magnetically. In this case when switch 13 is closed the oscillator produces oscillatory signals continuously, but when the tire pressure falls and the switch 13 opens, the oscillator is inhibited continuously in the case of the example of FIG. 1. In the examples shown in FIGS. 2 and 3 the oscillator will resume oscillation after an interval determined by components 171 and 181 or 286 and 287, but this interval is long enough to ensure that memory circuit 40 is set.

It will be appreciated that the l.e.d. 44 will light indicating a fault condition if the oscillator fails to oscillate as a result of a malfunction of the circuit.

The invention may also be applied to other electrical systems in which it is required to detect the state of an isolated switch, where it is required to maintain isolation between the switch and the detecting circuit. For example, the circuit described can be used to provide an input to a tractor vehicle control circuit in response to a switch on a trailer vehicle. The two inductors being incorporated in mating parts of a contactless connector.

We claim:

1. A circuit for detecting the condition of an isolated switch contact comprising:
   a first tuned circuit having a resonant frequency and including a first inductor, said switch contact being connected in parallel with said first tuned circuit; and
   an oscillator circuit including means for continuously providing an oscillatory output when said switch contact is closed and inhibiting said oscillatory output when said switch contact is open, said means comprising an amplifier having a resistive negative feedback path and a positive feedback path shunted to "earth" by a further tuned circuit tuned to said resonant frequency and including a further inductor and a capacitor connected in parallel, and means for absorbing oscillations of the oscillator circuit in said first tuned circuit when said switch contact is open by at least intermittently magnetically coupling said first and further inductors.

2. A circuit as claimed in claim 1 in which said amplifier is an operational amplifier having an output terminal, an inverting input terminal and a non-inverting input terminal, wherein said resistive negative feedback path comprises a resistor connected between said output terminal and said inverting input terminal, and wherein said positive feedback path comprises a further resistor connecting said output terminal to said non-inverting input terminal and said further tuned circuit connected between said non-inverting input terminal and "earth".

3. A circuit as claimed in claims 1 or 2 further comprising a detector circuit connected to the output of the oscillator circuit and producing a d.c. output whenever the oscillator produces an oscillating output.

4. A circuit as claimed in claim 3 further comprising a voltage comparator connected to the output of the detector and operating to compare the output of the detector with a reference voltage.

5. A circuit as claimed in claim 4 further comprising a flip-flop memory circuit biased initially to one of its stable states and arranged to be triggered to the other of its stable states by the output of the comparator when the oscillator circuit ceases to produce an oscillating signal for a period of time of duration in excess of a predetermined limit.

6. A circuit as claimed in claim 2 further comprising a semiconductor variable impedance device connected across said further tuned circuit and a control circuit connected to control said device in accordance with the amplitude of the output of the operational amplifier, so as to decrease the impedance of said device as such amplitude increases.

7. A circuit as claimed in claim 6 in which said control circuit comprises a further operational amplifier having its inverting input connected by a resistor to the junction of two resistors which are in series between the output of the first-mentioned operational amplifier and "earth", a diode connected across one of said two resistors, a resistor and capacitor connected in parallel between the output terminal of said further operational amplifier and the inverting input thereof, means applying a reference voltage to the non-inverting input of said further operational amplifier, and a time constant circuit connecting the output of said further operational amplifier to a control terminal of the variable impedance device.

8. A circuit as claimed in claim 2 further comprising a semiconductor variable impedance device connected between the inverting input of said operational amplifier and "earth" and control means sensitive to the amplitude of the output of the oscillator for varying the impedance of said device so as to reduce such impedance as the amplitude increases.

9. A circuit as claimed in claim 8 in which said control means includes a resistor and a first capacitor in parallel between a control terminal of said device and "earth" and a diode and a further capacitor in series between the output of the operational amplifier and said control terminal, whereby the voltage on said first capacitor which determines the impedance of said device varies in accordance with said amplitude.

10. A vehicle tire pressure monitoring system comprising:
    a first tuned circuit having a resonant frequency and including a first inductor;
    tire pressure-sensitive switch means connected in parallel with said first tuned circuit and providing a switch closure when the associated tire pressure is in excess of a predetermined pressure level, said first tuned circuit and said switch means being mounted on a vehicle wheel assembly;
    an oscillator circuit including further means for continuously providing an oscillatory output when said switch means is closed and inhibiting said oscillatory output when said switch means is open, said further means comprising an amplifier having a resistive negative feedback path and a positive feedback path shunted to "earth" by a further tuned circuit tuned to said resonant frequency and including a further inductor and a capacitor connected in parallel; and
    means for absorbing oscillations of said oscillator circuit in said first tuned circuit when said switch means is open by at least periodically magnetically coupling said first and further inductors when said vehicle wheel assembly is rotating.

11. A system as claimed in claim 10 in which said amplifier is an operational amplifier having an output terminal, an inverting input terminal, and a non-inverting input terminal, wherein said resistive negative feedback path comprises a resistor connected between said output terminal and said inverting input terminal, and wherein said positive feedback path comprises a further resistor connecting said output terminal to said non-inverting input terminal and said further tuned circuit connected between said non-inverting input terminal and "earth".

12. A system as claimed in claims 10, or 11 further comprising a detector circuit connected to the output of the oscillator and producing a d.c. output whenever the oscillator produces an oscillating output.

13. A system as claimed in claim 12 further comprising a voltage comparator connected to the output of the detector and operating to compare the output of the detector with a reference voltage.

14. A system as claimed in claim 13 further comprising a flip-flop memory circuit biased initially to one of its stable states and arranged to be triggered to the other of its stable states by the output of the comparator when the oscillator circuit ceases to produce an oscillating signal for a period of time of duration in excess of a predetermined limit.

15. A system as claimed in claim 11 further comprising a semiconductor variable impedance device connected across said further tuned circuit and a control circuit connected to control said device in accordance with the amplitude of the output of the operational amplifier, so as to decrease the impedance of said device as such amplitude increases.

16. A system as claimed in claim 15 in which said control circuit comprises a further operational amplifier having its inverting input connected by a resistor to the junction of two resistors which are in series between the output of the first-mentioned operational amplifier and "earth", a diode connected across one of said two resistors, a resistor and capacitor connected in parallel between the output terminal of said further operational amplifier and the inverting input thereof, means applying a reference voltage to the non-inverting input of said further operational amplifier, and a time constant circuit connecting the output of said further operational amplifier to a control terminal of the variable impedance device.

17. A system as claimed in claim 1 further comprising a semiconductor variable impedance device connected between the inverting input of said operational amplifier and "earth" and control means sensitive to the amplitude of the output of the oscillator for varying the impedance of said device so as to reduce such impedance as the amplitude increases.

18. A system as claimed in claim 17 in which said control means includes a resistor and a first capacitor in parallel between a control terminal of said device and "earth" and a diode and a further capacitor in series between the output of the operational amplifier and said control terminal, whereby the voltage on said first capacitor which determines the impedance of said device varies in accordance with said amplitude.

* * * * *